(12) United States Patent
Xie et al.

(10) Patent No.: US 10,826,961 B2
(45) Date of Patent: Nov. 3, 2020

(54) MULTIMEDIA PLAYER DEVICE AUTOMATICALLY PERFORMS AN OPERATION TRIGGERED BY A PORTABLE ELECTRONIC DEVICE

(71) Applicant: Beijing Xiaomi Mobile Software Co., Ltd., Beijing (CN)

(72) Inventors: Yan Xie, Beijing (CN); Yue Cheng, Beijing (CN); Longxiang Wan, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 249 days.

(21) Appl. No.: 15/785,438

(22) Filed: Oct. 17, 2017

(65) Prior Publication Data

US 2018/0109582 A1 Apr. 19, 2018

(30) Foreign Application Priority Data

Oct. 18, 2016 (CN) .......................... 2016 1 0909455

(51) Int. Cl.
| | |
|---|---|
| G06F 15/16 | (2006.01) |
| H04L 29/06 | (2006.01) |
| H04N 21/442 | (2011.01) |
| H04N 21/45 | (2011.01) |
| H04N 21/41 | (2011.01) |

(Continued)

(52) U.S. Cl.
CPC ........ *H04L 65/604* (2013.01); *H04L 12/2816* (2013.01); *H04L 65/1069* (2013.01); *H04L 67/22* (2013.01); *H04N 21/4131* (2013.01); *H04N 21/43615* (2013.01); *H04N 21/44222* (2013.01); *H04N 21/44231* (2013.01); *H04N 21/4532* (2013.01); *H04N 21/4882* (2013.01); *H04N 21/8126* (2013.01); *H04N 21/84* (2013.01); *G06K 9/00469* (2013.01); *H04L 67/42* (2013.01); *H04N 21/25891* (2013.01); *H04N 21/6543* (2013.01)

(58) Field of Classification Search
USPC ....................................................... 709/227
See application file for complete search history.

(56) References Cited

U.S. PATENT DOCUMENTS

| | | | |
|---|---|---|---|
| 6,850,252 B1 | 2/2005 | Hoffberg | |
| 8,526,884 B1 * | 9/2013 | Price ...................... | H04W 4/21 455/41.2 |

(Continued)

OTHER PUBLICATIONS

European Search Report in European application No. 17196867.0, dated Feb. 28, 2018.

*Primary Examiner* — Alicia Baturay
(74) *Attorney, Agent, or Firm* — Jun He Law Offices P.C.; James J. Zhu

(57) ABSTRACT

The present disclosure relates to computer and internet technology, and more particularly to an operating method, apparatus, and computer readable storage medium. The method comprises: obtaining an information processing result in accordance with user interest information; identifying a second terminal device associated with the user interest information; and transmitting the information processing result to the second terminal device via a communication connection established with the second terminal device, wherein the second terminal device performs a corresponding operation in accordance with the information processing result.

18 Claims, 4 Drawing Sheets

(51) Int. Cl.
*H04N 21/488* (2011.01)
*H04N 21/84* (2011.01)
*H04N 21/81* (2011.01)
*H04N 21/436* (2011.01)
*H04L 12/28* (2006.01)
*H04L 29/08* (2006.01)
*H04N 21/258* (2011.01)
*H04N 21/6543* (2011.01)
*G06K 9/00* (2006.01)

(56) References Cited

U.S. PATENT DOCUMENTS

| | | | |
|---|---|---|---|
| 8,994,540 B2 * | 3/2015 | Fadell | H04L 12/6418 340/628 |
| 9,007,222 B2 * | 4/2015 | Mittleman | H04L 12/282 340/628 |
| 9,046,414 B2 * | 6/2015 | Fadell | G06K 9/00369 |
| 9,130,910 B1 * | 9/2015 | Logue | H04L 63/0428 |
| 9,241,270 B1 * | 1/2016 | Logue | H04W 76/10 |
| 9,294,340 B1 * | 3/2016 | Logue | H04L 67/10 |
| 9,430,925 B2 * | 8/2016 | Mittleman | G08B 17/107 |
| 9,444,631 B2 * | 9/2016 | Logue | H04L 9/3263 |
| 9,635,536 B2 * | 4/2017 | Narang | H04L 12/2809 |
| 9,640,061 B1 * | 5/2017 | Klimanis | H04W 76/14 |
| 9,652,912 B2 * | 5/2017 | Fadell | G08B 27/003 |
| 9,711,036 B2 * | 7/2017 | Fadell | G06Q 10/083 |
| 9,869,484 B2 * | 1/2018 | Hester | F24F 11/30 |
| 10,079,012 B2 * | 9/2018 | Klimanis | G10L 15/065 |
| 10,084,783 B2 * | 9/2018 | Dubman | H04L 63/10 |
| 10,104,132 B2 * | 10/2018 | Logue | H04L 12/2818 |
| 10,178,474 B2 * | 1/2019 | Klimanis | H04L 12/2823 |
| 10,203,748 B2 * | 2/2019 | Turon | H04L 12/2816 |
| 10,209,688 B2 * | 2/2019 | Stefanski | G05B 15/02 |
| 10,302,499 B2 * | 5/2019 | Dixon | H05B 47/11 |
| 10,375,150 B2 * | 8/2019 | Reddy | H04L 12/2823 |
| 10,393,589 B2 * | 8/2019 | Fadell | G06K 9/00369 |
| 10,393,590 B2 * | 8/2019 | Fadell | H05B 47/19 |
| 10,397,228 B2 * | 8/2019 | Dubman | H04L 12/2825 |
| 2018/0174574 A1 * | 6/2018 | Laroche | G10L 15/08 |

* cited by examiner

MULTIMEDIA PLAYER DEVICE AUTOMATICALLY PERFORMS AN OPERATION TRIGGERED BY A PORTABLE ELECTRONIC DEVICE

CROSS-REFERENCE TO RELATED APPLICATIONS

This application claims priority to Chinese Patent Application No. 201610909455.4, filed with the State Intellectual Property Office on Oct. 18, 2016 and titled "OPERATING METHOD, APPARATUS AND SYSTEM", the entire contents of which are incorporated herein by reference.

TECHNICAL FIELD

The present disclosure relates to computer and internet technology, and more particularly to an operating method, apparatus, and computer readable storage medium.

BACKGROUND

At present, terminal devices, such as mobile phones, smart TVs, smart home appliances, and others, have been used extensively.

The terminal devices can perform various operations to achieve a variety of different functions. In the related art, the operations performed by the terminal devices are controlled and triggered by users. For example, when a user wants a smart TV to play a movie, the user selects or searches the movie on the smart TV, and then triggers a play command to the smart TV for playing the movie.

SUMMARY

Embodiments of the present disclosure provide an operating method, apparatus, and computer readable storage medium, the technical solutions are as following:

According to a first aspect of embodiments of the present disclosure, an operating method is provided. The method comprises: acquiring user interest information indicating information in which a user of a first terminal device is interested; processing the user interest information, to obtain an information processing result; identifying a second terminal device associated with the user interest information; and transmitting the information processing result to the second terminal device via a communication connection established between the first terminal device and the second terminal device, wherein the second terminal device performs a corresponding operation in accordance with the information processing result.

In some embodiments, processing the user interest information to obtain an information processing result comprises: retrieving corresponding search result based on search information, when the user interest information is the search information input by the user of the first terminal device; or, parsing data information and acquiring first key information, when the user interest information is the data information browsed by the user of the first terminal device; or, parsing subscription information and acquiring second key information, when the user interest information is the subscription information subscribed by the user of the first terminal device.

In some embodiments, identifying the second terminal device associated with the user interest information comprises: identifying smart terminal devices bound to the first terminal device; obtaining an information type corresponding to the user interest information; inquiring predetermined correlations to select a second terminal device corresponding to the information type from the smart terminal devices bound to the first terminal device; wherein the predetermined correlations include a correlation between the information type and the intelligent terminal device.

In some embodiments, obtaining the information type corresponding to the user interest information includes: extracting a keyword from the user interest information, to determine the information type corresponding to the user interest information according to a correlation between the keyword and the information type; or determining the information type corresponding to the user interest information according to the information processing result corresponding to the user interest information.

In some embodiments, inquiring the predetermined correlation and selecting the second terminal device corresponding to the information type from the smart terminal devices bound to the first terminal device, comprises: selecting a multimedia player device from the smart terminal devices bound to the first terminal device, the information type is multimedia information, wherein the multimedia player device is the second terminal device; or selecting a smart home device from the smart terminal devices bound to the first terminal device, when the information type is weather information, wherein the smart home device is the second terminal device.

In some embodiments, transmitting the information processing result to the second terminal device via a communication connection established between the first terminal device and the second terminal device, comprises: transmitting the information processing result to a server, wherein the server forwards the information processing result to the second terminal device; or, transmitting the information processing result to a router, wherein the router forwards the information processing result to the second terminal device; or, transmitting the information processing result to the second terminal device via a direct communication connection established between the first and second terminal devices.

In some embodiments, the method further comprises: generating prompt information, when the second terminal device is in an off state, and the first terminal device and the second terminal device are located in the same space; wherein the prompt information prompts the user of the first terminal device to turn on the second terminal device, wherein the second terminal device performs the corresponding operation in accordance with the information processing result.

According to a second aspect of embodiments of the present disclosure, an operating method is provided. The method comprises: receiving an information processing result obtained by processing user interest information transmitted by a first terminal device via a communication connection established with the first terminal device; wherein the user interest information is the information in which a user of the first terminal device is interested; and performing a corresponding operation in accordance with the information processing result.

In some embodiments, performing the corresponding operation according to an information type of the information processing result, comprises: playing multimedia information corresponding to an information type of the information processing result, when the information type of the information processing result is multimedia information; or, adjusting home environment according to weather information corresponding to an information type of the information processing result, when the information type of the information processing result is the weather information.

In some embodiments, receiving the information processing result obtained by processing the user interest information transmitted by the first terminal device via the communication connection established with the first terminal device comprises: receiving the information processing result forwarded by the server after it is transmitted by the first terminal device to the server; or, receiving the information processing result forwarded by the router after it is transmitted by the first terminal device to the router; or, receiving the information processing result from the first terminal device, via the direct communication connection established with the first terminal device.

According to a third aspect of embodiments of the presently disclosure, an operation apparatus is provided. The operation apparatus comprises: a processor and a memory storage medium storing executable instructions executed by the processor; wherein the processor is configured to: acquire user interest information in which a user of a first terminal device is interested; process the user interest information to obtain an information processing result; identify a second terminal device associated with the user interest information; transmit the information processing result to the second terminal device via a communication connection established between the first terminal device and the second terminal device, wherein the second terminal device performs a corresponding operation in accordance with the information processing result.

In some embodiments, the processor is further configured to: retrieve a corresponding search result based on search information, when the user interest information is search information input by the user of the first terminal device; or, parse data information and acquire first key information, when the user interest information is data information browsed by the user of the first terminal device; or parse subscription information and acquire second key information, when the user interest information is the subscription information subscribed by the user of the first terminal device.

In some embodiments, the processor is further configured to: identify smart terminal devices bound to the first terminal device; obtain an information type corresponding to the user interest information; inquire predetermined correlations to select the second terminal device corresponding to the information type from the smart terminal devices bound to the first terminal device, wherein the predetermined correlations include a correlation between the information type and the intelligent terminal device.

In some embodiments, the processor is further configured to: extract a keyword from the user interest information to determine the information type corresponding to the user interest information according to a correlation between the keyword and the information type; or, determine the information type corresponding to the user interest information in accordance with the information processing result corresponding to the user interest information.

In some embodiments, the processor is further configured to: select a multimedia player device from the intelligent terminal device bound to the first terminal device, when the information type is multimedia information, wherein the multimedia player device is the second terminal device; or, select a smart home device from the intelligent terminal device bound to the first terminal device, when the information type is weather information, wherein the smart home device is the second terminal device.

In some embodiments, the processor is further configured to: transmit the information processing result to a server, wherein the server forwards the information processing result to the second terminal device; or, transmit the information processing result to a router, wherein the router forwards the information processing result to the second terminal device; or, transmit the information processing result to the second terminal device via a direct communication connection established between the first and second terminal devices.

In some embodiments, the processor is further configured to: generate prompt information when the second terminal device is in an off state, and the first terminal device and the second terminal device are located in the same space; wherein the prompt information prompts the user of the first terminal device to turn on the second terminal device, wherein the second terminal device performs the corresponding operation based on the information processing result.

According to a fourth aspect of embodiments of the present disclosure, an operating apparatus is provided. The apparatus comprises: a processor and a memory storage storing executable instructions executed by the processor; wherein the processor is configured to: receive the information processing result obtained by processing the user interest information transmitted by the first terminal device via the communication connection established with the first terminal device; wherein the user interest information is the information in which the user of the first terminal device is interested; and perform a corresponding operation according to the information processing result.

In some embodiments, the processor is further configured to: when information type of the information processing result is multimedia information, play the multimedia information corresponding to the information type of the information processing result; or, when the information type of the information processing result is weather information, adjust home environment according to the weather information corresponding to the information type of the information processing result.

In some embodiments, the processor is further configured to: receive the information processing result forwarded by the server after transmitted by the first terminal device thereto; or, receive the information processing result forwarded by the router after transmitted by the first terminal device thereto; or receive the information processing result from the first terminal device, via the direct communication connection established therewith.

According to a fifth aspect of embodiments of the present disclosure, an operating system is provided. The system comprises: a first terminal device and a second terminal device; wherein the first terminal device includes an operating device based on a third party or any optional design provided by the third party; and the second terminal device includes an operating device based on a fourth party or any optional design provided by the fourth party.

The technical solution provided by the present disclosure may include the following advantageous benefits:

by obtaining the user interest information through the first terminal device, determining the second terminal device associated with the user interest information, performing the corresponding operation by the second terminal device according to the information processing result corresponding to the user interest information; the problem of low automation degree of operations performed by the terminal device, due to the operations performed by the terminal device requiring manual control and trigger of the user. By associating the different terminal devices with each other, the associated second terminal device is triggered by the first terminal device to perform the corresponding operation automatically, resulting in an improved automation degree of the operation performed by the terminal device.

It is understandable, that both the foregoing general description and the following detailed description are exemplary only, and are not intended to limit the present disclosure.

BRIEF DESCRIPTION OF THE DRAWINGS

The drawings herein are incorporated in and constitute a part of this specification of the present disclosure, showing embodiments consistent with the present disclosure, and explaining the principles of the present disclosure together with the description.

DETAILED DESCRIPTION OF THE EMBODIMENTS

Figure 1:
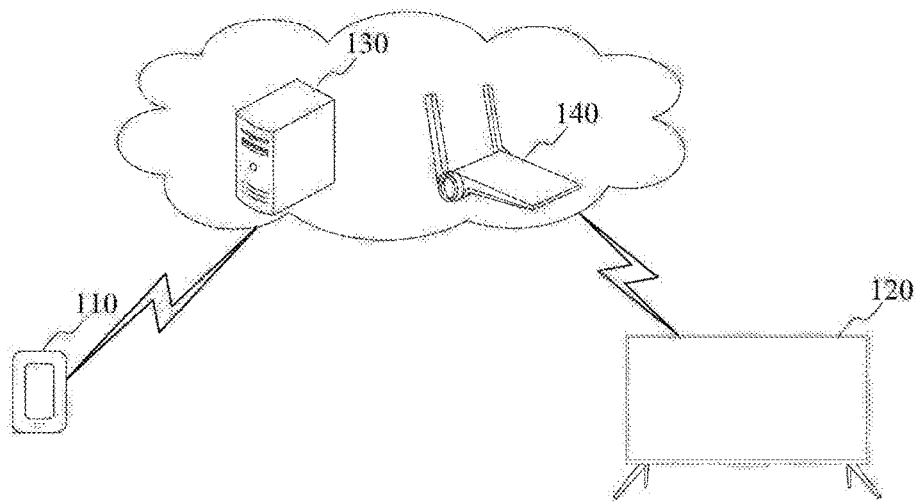
FIG. 1 is a schematic diagram of an implementation environment shown in accordance with an exemplary embodiment.

Hereinafter, exemplary embodiments will be described in details, and shown in the drawings. In the following description when referring to the drawings, the same numerals in the different drawings denote the same or similar elements unless otherwise indicated. The embodiments described in the following exemplary embodiments are not representative of all embodiments consistent with the present disclosure. Rather, they are merely examples of devices and methods consistent with some aspects of the present disclosure as detailed in the appended claims.

In the related art, since operations performed by a terminal device need to be controlled and triggered by the user, the level of automation of the operation performed by the terminal device is not high. Accordingly, embodiments of the present disclosure provide an operating method, and an apparatus and system based on this method, to solve the problems existing in the related art described above. The present disclosure provides a technical solution in which different terminal devices are interrelated and the second terminal device triggered by the first terminal device automatically performs the corresponding operation, thereby improving the degree of automation of the operation performed by the terminal device. The embodiments of the present disclosure will be described in further detail below with reference to the general aspects thereof.

FIG. 1 is schematic diagram of an implementation environment shown in accordance with an exemplary embodiment. The implementation environment may include a first terminal device 110 and at least a second terminal device 120.

The first terminal device 110 and the second terminal device 120 are electronic devices having computation capability, such as mobile phones, tablet PCs, computers, smart televisions, and the like. In one example, the first terminal device 110 is a portable electronic device, and the second terminal device 120 is a multimedia player device or a smart home device. Among them, the portable electronic devices can be mobile phones, tablet PCs, wearable devices, etc. The multimedia player device can be smart TVs, smart speakers, smart projectors and so on. The smart home device can be smart air conditioners, smart air purifiers, smart water purifiers and so on.

The communication between the first terminal device 110 and the second terminal device 120 is established.

In one example, as shown in FIG. 1, the implementation environment further includes a server 130. The first terminal device 110 and the second terminal device 120 establish the communication connection with the server 130 through a wired or wireless network, respectively, and the first terminal device 110 and the second terminal device 120 communicate via the server 130.

In another example, as shown in FIG. 1, the implementation environment also includes a router 140. The first terminal device 110 and the second terminal device 120 establish the communication connection with the router 140 through a wired or wireless network, respectively, and the first terminal device 110 and the second terminal device 120 communicate via the router 140.

In another example, a direct communication connection is established between the first terminal device 110 and the second terminal device 120, such that, the direct communication connection between the first terminal device 110 and the second terminal device 120 can be established via Bluetooth.

In some embodiments, the number of the second terminal device 120 is one. In real implementation, the number of the second terminal device 120 can be more than one, such as two or three.

Figure 2A:
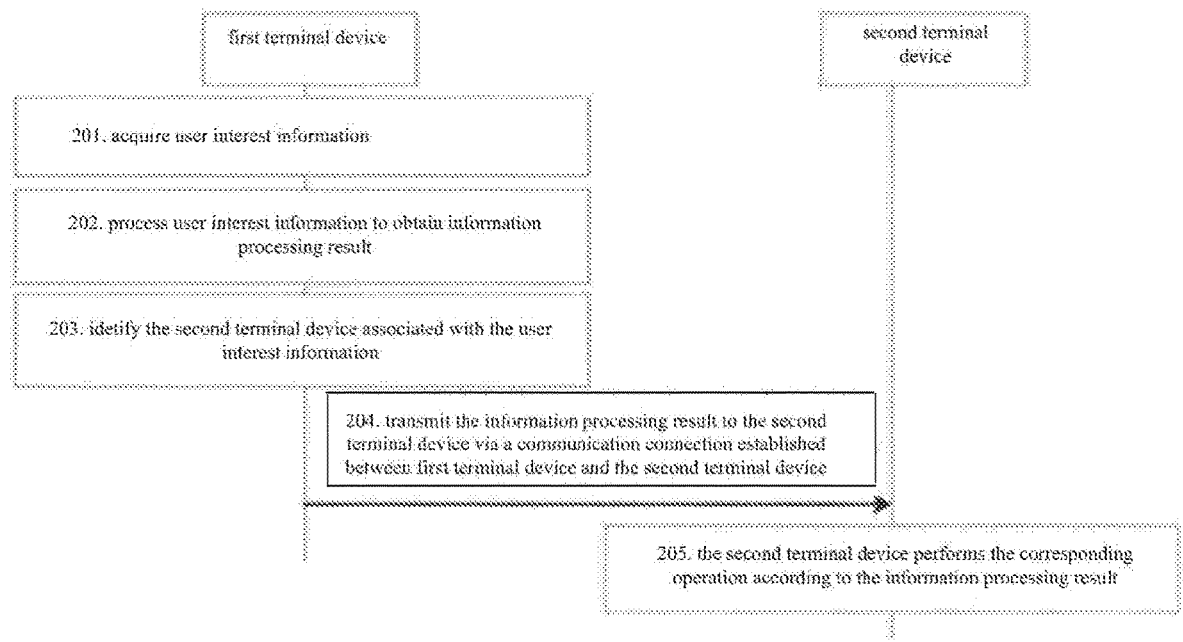
FIG. 2A is a flow diagram of an operating method shown in accordance with an exemplary embodiment.

FIG. 2A is a flow diagram of an operating method shown in accordance with an exemplary embodiment. The method can be applied to the implementation environment shown in FIG. 1, and may include the following steps.

At step 201, the first terminal device acquires user interest information.

The user interest information can refer to the information in which the user of the first terminal device is interested. The user interest information may be search information input by the user of the first terminal device, browsing information, subscription information, etc.

In one example, the first terminal device can acquire an operation record of the user, filter to obtain the interest operation from the operation record, and determine the information corresponding to the interest operation as the user interest information. The operation record can refer to recorded information of the operation performed by the user on the first terminal device.

In some embodiments, the operation record may be an operation record of the user in one or some specific applications installed by the first terminal device, such as the browsing record of browser A.

In this case, when the first terminal device filters to obtain the interest operation from the operation record, all the operations in the operation record of a specific application can be determined as the interest operation. For example: all the operations received by the browser A are the interest operation.

In some embodiments, when the first terminal device filters to obtain the interest operation from the operation record, specific operations in the operation record of the specific application can be determined as the interest operation. For example, the retrieval operations in the operation record of the browser A are determined as the interest operation. Here, the operation record records an operation type corresponding to each operation. For example, operation 1 for the retrieval type, operation 2 for the browsing type.

The first terminal device may record the operation type corresponding to the operation by an operation type identifier. The operation type identifier is used to indicate a certain type of operation, which may be represented by a number, a letter, a character, or the like. For example, the operation is a retrieval operation when the operation type identifier is 1; the operation is a browsing operation when the operation type identifier is 2.

In some embodiments, the operation record can be a global operation record of the user in the first terminal device, such as the operation record of all the applications in the first terminal device.

In this case, each operation recorded in the operation record corresponds to the name of the application receiving the operation. When the first terminal device filters to obtain the interest operation from the operation record, all the operations corresponding to a specific application are determined as the interest operation. For example, the global operation record includes operation 1 received by application 1, operation 2 received by application 2, and operation 3 received by application 3. The first terminal device determines the operation 2 received by the specific application (application 2) as the interest operation.

In some embodiments, when the first terminal device filters to obtain the interest operation from the operation record, specific operations received by a specific application may be determined as the interest operation. For example, the search operations received by the specific application (application 2) in the global operation record are determined as the interest operation. Here, the operation record records the operation type corresponding to each operation. For example, operation 1 for the search type, operation 2 for the browsing type.

The interest operation can refer to a user operation performed by the user of the first terminal device for indicating interest of target contents. For example, the interest operation may be a search operation, a browsing operation, a subscription operation, or the like.

For example, the first terminal device determines the search operation received by the search engine as the interest operation. When the user performs a retrieval operation on the search engine of the first terminal device, the information corresponding to the retrieval operation, such as the search information input by the user, is "xx movie". The search engine records the retrieving operation and the information corresponding to the retrieving operation in the operation record. When the first terminal device needs to acquire the user interest information, the search operation received by the search engine in the operation record is determined as the interest operation, the information corresponding to the interest operation, such as "xx movie" can be determined as the user interest information.

For another example, the first terminal device determines the retrieval operation received by the search engine as the interest operation. The user performs a browsing operation in the web browser of the first terminal device, the web browser records the browsing operation and the data information corresponding thereto, such as the data information browsed by the user, in the operation record. When the first terminal device needs to acquire the user interest information, the browsing operation received by the web browser in the operation record can be determined as the interest operation, the information corresponding to the interest operation can be the user interest information, such as news information, weather information, entertainment information, etc.

For another example, the first terminal device determines the subscription operation received by the video player as the interest operation. The user performs a subscription operation in the video player of the first terminal device, and the video player records the subscription operation and the information corresponding to the subscription operation (i.e., the subscription information of the user subscription) in the operation record. When the first terminal device needs to acquire the user interest information, the subscription operation received by the video player in the operation record is determined as the interest operation, and the information corresponding to the interest operation is determined as the user interest information, such as the video information.

In some embodiments, the retrieval operation may be at least one of a click operation, a long press operation, and a slide operation acting on the retrieval option; or the retrieval operation may also be an operation following a voice inputting retrieval instruction. Wherein, the retrieval option may be a virtual key provided by the first terminal device, or a physical key provided by the first terminal device.

In some embodiments, the browsing operation may be at least one of a click operation, a long press operation, and a slide operation acting on the browsing option; or the browsing operation may also be an operation following a voice inputting browsing instruction. Wherein, the browsing content can be an overview of all the contents that the user needs to browse, the names of all the contents that the user needs to browse, the content can be the first sentence of all the contents that the user needs to browse, etc.

In some embodiments, the subscription operation may be at least one of a click operation, a long press operation, and a slide operation acting on the subscription option; or the subscription operation may also be an operation of voice inputting subscription instruction. Wherein, the subscription option is an option different from the retrieval option provided by the first terminal device, the subscription option may be a virtual key, or a physical key provided by the first terminal device.

At step 202, the first terminal device can process the user interest information to obtain the information processing result.

In accordance with several different implementations of the user interest information, the user interest information can be processed differently.

In a first possible implementation, if the user interest information is the search information input by the user of the first terminal device, the first terminal device can retrieve the corresponding search result based on the search information. Here, the user interest information can be the search information input by the user, and the information processing result can be the search result.

In some embodiments, when the search result includes a plurality of contents, the first terminal device can filter the plurality of contents according to a preset filtering rule, and obtain one item of the plurality of contents. Wherein, the preset filtering rule includes, but is not limited to, one or more of the followings: selecting most clicked contents, selecting contents best matching with the retrieved information, selecting contents selected by the user of the first terminal device.

In a second possible implementation, if the user interest information is the information browsed by the user of the first terminal device, the first terminal device can parse the data information to obtain first key information. Here, the user interest information can be the data information browsed by the user, and the information processing result can be the first key information.

The data information can refer to information for the users to read and/or use. For example, the data information can be the news information, weather information, entertainment information, etc. The first key information parsed from the data information can be the information reflecting the main content of the data information. For example, when the data information is the news information, the corresponding first key information can be news headlines. For another example, when the data information is weather information, the corresponding first key information can be weather types, temperature, humidity, air pollution index, etc.

In the third possible implementation, the first terminal device parses the subscription information to obtain second key information, if the user interest information is the subscription information subscribed by the user of the first terminal device. Here, the user interest information can be the subscription information subscribed by the user, and the information processing result can be the second key information.

The subscription information can refer to the information subscribed by the user, such as video update notification, music update notification, weather change forecast, etc. The second key information parsed from the subscription information can be the information reflecting the main contents of the subscription information. For example, when the subscription information is the video update notification, the corresponding second key information may be names of the updated videos; for another example, when the subscription information is the weather change forecast, the corresponding second key information may be the weather types, temperature, humidity, air pollution index, etc. after change.

In addition, for the second or third possible implementation described above, the means to parse information can include, but is not limited to, at least one of the followings: keyword extraction, semantic analysis, image recognition, speech recognition, etc.

At step 203, the first terminal device can identify the second terminal device associated with the user interest information.

The second terminal device can be used to perform the corresponding operation according to the information processing result. In one example, this step may comprise the following sub steps.

1. Obtaining smart terminal devices bound to the first terminal device.

The binding relationship between the first terminal device and the smart terminal device can be established in advance. The requester for establishing the binding relationship may be the first terminal device, or other smart terminal devices. The first terminal device can record the device identification of each intelligent terminal device establishing the binding relationship therewith. In some embodiments, the first terminal device can also record the device type of each intelligent terminal device establishing the binding relationship therewith. For example, the device type may include a multimedia player device, a smart home device, etc.

In some embodiments, the device type can be input by the user of the first terminal device; or, can be sent by the intelligent terminal device.

Figure 2B:
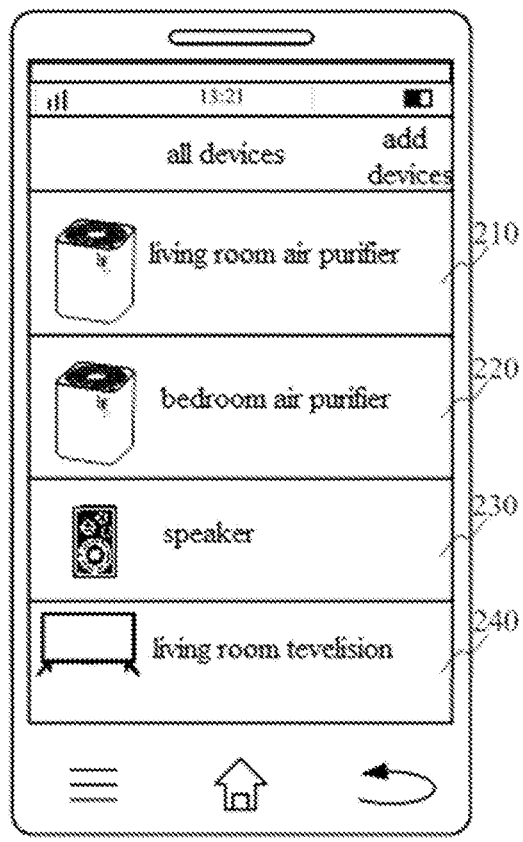
FIG. 2B is a schematic diagram of a smart terminal device bound to a first terminal device in accordance with an exemplary embodiment.

As shown in FIG. 2B, the smart terminal devices are bound to the first terminal device. The smart terminal devices include a living room air purifier 210, a bedroom air purifier 220, a speaker 230, and a living room TV 240. Wherein, the living room air purifier 210 and the bedroom air purifier 220 are smart home appliances, the speaker 230 and the living room television 240 are multimedia player devices. In some embodiments, the names of the individual smart terminal devices in FIG. 2B are set by the user when establishing a binding relationship.

In some embodiments, the binding relationship between the first terminal device and the smart terminal device is established by a preset application in the first terminal device for managing each of the smart terminal devices.

2. Obtaining information types corresponding to the user interest information.

Wherein, the information types can include but are not limited to multimedia information, weather information, etc. In actual applications, the information types can be classified according to actual requirements. For example, the multimedia information can be further classified into video information, audio information and so on. For another example, the weather information can be further classified into weather type information, temperature information, humidity information, air pollution index information, and so on.

In one example, the first terminal device can acquire the keyword from the user interest information, and determine the information type corresponding to the user interest information according to the correlation between the keyword and the information type.

Assuming that the user interest information is the search information input by the user and the search information is "xx movie", the first terminal device can acquire the keyword "movie" from the search information, and determine the information type corresponding to the user interest information is the video information, according to the correlation between the keyword and the information type.

Assuming the user interest information is data information browsed by the user, wherein the data information is "xx movie review". Then the first terminal device extracts the keyword "movie" from the data information of the first terminal device. According to the correspondence relationship between the keyword and the information type, the information type corresponding to the user interest information is video information.

Assuming the user interest information is subscription information subscribed by the user, wherein the subscription information is "xx movie show time". Then the first terminal device extracts the keyword "movie" from the subscription information of the first terminal device. According to the correspondence relationship between the keyword and the information type, the information type corresponding to the user interest information is video information.

In another example, the first terminal device can determine the information type corresponding to the user interest information based on the information processing result corresponding to the user interest information.

Wherein, the information type of the information processing result is the same as the information type of the user interest information. The first terminal device obtains the keyword from the information processing result; determines the information type corresponding to the information processing result according to the correlation between the keyword and the information type of the information processing result, and determines the information type as the information type corresponding to the user interest information.

Assuming the user interest information is the retrieval information searched by the user, and the information processing result corresponding to the retrieval information is a movie introduction, the first terminal device can extract a keyword "movie" from the movie introduction, according to the correspondence between the keyword and the information type, determine that the information type of the information processing result is video information, the information type corresponding to the user interest information is the video information too.

Assuming the user interest information is the data information, and the information processing result corresponding to the data information includes weather information such as the weather types, temperature, humidity, etc., the first terminal device can extract a keyword of "centigrade" from the information processing result, according to the correspondence between the keyword and the information type, determine that the information type of the information processing result is weather information, the information type corresponding to the user interest information is the weather information.

Assuming the user interest information is the subscription information, and the information processing result corresponding to the subscription information includes the xx movie update notification, the first terminal device can extract a keyword "movie" from the information processing result, and according to the correspondence between the keyword and the information type, determine that the information type of the information processing result is video information, and the information type corresponding to the user interest information is the video information too.

3. Inquiring preset correlations to select the second terminal device corresponding to the information type from the smart terminal devices bound to the first terminal device;

Wherein, the preset correlations can include a correlation between the information type and the smart terminal device.

In some embodiments, the preset correlation may be added by the user to the first terminal device, when a binding relationship between the first terminal device and the intelligent terminal devices is set; or, the preset correlation may be sent by the server to the first terminal device, after a binding relationship between the first terminal device and the intelligent terminal devices is set.

If the information type is multimedia information, the first terminal device can select the multimedia player device from the intelligent terminal devices bound to the first terminal device, and the multimedia player device can be the second terminal device. Wherein, the multimedia player device can be smart speakers, smart TVs, smart projectors, computers, tablet devices, etc.

Noticeably, the number of the multimedia player devices selected by the first terminal device may be one or more, such as two or three, while the embodiments of the present disclosure do not limit thereto. When the number of the multimedia player devices selected by the first terminal device is plural, the plurality of multimedia playback devices can be controlled to perform corresponding operations, respectively; or, one of the multimedia player devices can be selected from the plurality of multimedia player devices to perform the corresponding operation according to a preset rule. Wherein, the preset rule may be a set of priorities for different multimedia player devices, one of the multimedia player devices can be selected according to the order of priorities from high to low; or, the preset rule may be randomly selecting one of the multimedia player devices, while the embodiments of the present disclosure do not limit thereto.

If the information type is weather information, the first terminal device can select a smart home device from the smart terminal devices bound to the first terminal device, and the smart home device can be the second terminal device. Wherein, the smart home device can be smart air conditioners, smart air purifiers, balancing vehicles, sweeping robots, smart water purifiers, and so on.

Noticeably, the number of smart home devices selected by the first terminal device may be one or more, such as two or three, while the embodiments of the present disclosure do not limit thereto. When the number of the smart home devices selected by the first terminal device is plural, the plurality of smart home devices can be controlled to perform corresponding operations, respectively; or, one of the smart home devices can be selected from the plurality of smart home devices to perform the corresponding operation according to a preset rule. Wherein, the preset rule may be a set of priorities for different smart home devices, one of the smart home devices can be selected according to the order of priorities from high to low; or, the preset rules may be randomly selecting one of the smart home devices, while the embodiments of the present disclosure do not limit thereto.

In one example, the above preset correlation can be shown in Table 1 below:

TABLE 1

| Information type | Intelligent terminal devices |
| --- | --- |
| Video information | Smart TVs |
| Audio information | Smartspeakers |
| Temperature information | Smart air conditioners |
| Air pollution index information | Smart air purifiers |
| . . . | . . . |

Noticeably, in the embodiments of the present disclosure, the execution order of the steps 202 and 203 may not be restricted. The step 203 may be performed before the step 202, or may be performed after the step 202, and may also be performed concurrently with the step 202.

At step 204, the first terminal device can transmit the information processing result to the second terminal device via a communication connection established between the first terminal device and the second terminal device.

Accordingly, the second terminal device can receive the information processing result obtained by processing the user interest information transmitted by the first terminal device, via the communication connection established between the first terminal device and the second terminal device.

In one example, if the above communication connection is established by the server, the first terminal device can transmit the information processing result to the server, and the server can forward the information processing result to the second terminal device. Accordingly, the second terminal device can receive the information processing result forwarded by the server after it is transmitted by the first terminal device to the server.

In another example, if the communication connection is established by the router, the first terminal device can send the information processing result to the router, and the router can forward the information processing result to the second terminal device. Accordingly, the second terminal device can receive the information processing result forwarded by the router after it is transmitted by the first terminal device to the router.

In another example, if the communication connection is a direct communication connection, the first terminal device can transmit the information processing result to the second terminal device through the direct communication connection established between the first device and the second terminal device. Accordingly, the second terminal device can receive the information processing result transmitted by the first terminal device directly.

At step 205, the second terminal device can perform the corresponding operation according to the information processing result.

For different second terminal devices, the operations performed may also be different.

In one example, if the information type of the information processing result is multimedia information, the second terminal device can play the information processing result having the information type of multimedia information. For example, when the information processing result is a movie, the second terminal device is the smart TV, and the information type of the information processing result is multimedia information, the smart TV may play the movie. For another example, when the information processing result is a song, and the second terminal device is the smart speaker, the smart speaker can play the song.

In another example, if the information type of the information processing result is weather information, the second terminal device can adjust the home environment according to the information processing result having the information type of weather information. For example, when the information type of the information processing result is weather information, and the second terminal equipment is the smart air conditioner, the smart air conditioner can adjust temperature setting of the smart air conditioner according to the temperature indicated by the information processing result. For another example, when the information type of the information processing result is weather information, and the second terminal device is the smart air purifier, the smart air purifier can adjust the operation state of the smart air purifier according to the air quality indicated by the information processing result.

In another example, if the information type of the information processing result is weather information, the second terminal device can adjust travel condition according to the information processing result having the information type of weather information. For example, when the information processing result is weather type (such as rainfall), and the second terminal equipment is the balancing vehicle, the balancing vehicle can prompt the user to change the travel method.

Wherein, the information type of the information processing result is the same as the information type of the user interest information.

Noticeably, in the present embodiment, the information processing result processed by the first terminal device according to the user interest information, and the operation performed according to the information processing result determined by the second terminal device can be shown in the example. In other embodiments, the information processing results can be processed according to the user interest information by the server or router, and the operation can be determined by the second terminal device according to the information processing result.

As described above, according to the method provided by the present embodiment, in accordance with the user interest information acquired by the first terminal device, the second terminal device associated with the user interest information can be determined, and the corresponding operation can be performed by the second terminal device according to the information processing results based on the user interest information; in the related art, the problem of low level of automation of the operation performed by the terminal device, due to the operations performed by the terminal device controlled and triggered by the user, can be resolved; by correlating different terminal devices with each other, the second terminal device can be triggered by the first terminal device and automatically perform the corresponding operation, resulting in improvement of the degree of automation of the operation performed by the terminal devices.

The information processing result obtained by processing the user interest information by the server or the router is described below. Hereinafter, a description will be given using the server as an example, and a description of the information processing result by the router is the same as the description of the information processing result by the server according to user interest information. The present embodiment does not repeat the description hereby.

Figure 2C:
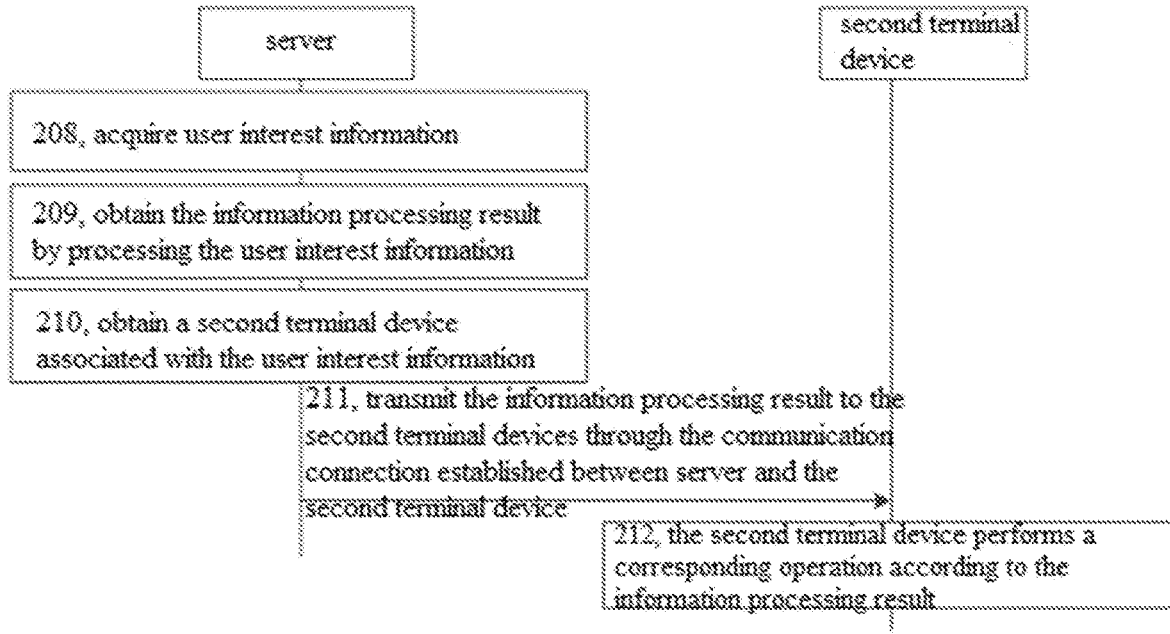
FIG. 2C is another flow diagram of an operating method shown in accordance with an exemplary embodiment.

FIG. 2C is a flow chart of an operating method shown in accordance with another exemplary embodiment. The method can be applied to the implementation environment shown in FIG. 1, the method may include the following steps.

At step 208, the server acquires user interest information.

Wherein the user interest information refers to information in which a user of the first terminal device is interested. The user interest information from the first terminal device can include the retrieval information entered by the user, the browsed data information, and subscribed subscription information.

In some embodiments, the user interest information obtained by the server is transmitted in real time or timely by the first terminal device; or the user interest information obtained by the server can be sent to the first terminal device according to an information acquisition request, after the first terminal device sends information acquisition request.

Wherein, the method that the first terminal device acquires the user interest information can be shown at the step 201, the present embodiment does not describe hereby.

At step 209, the information processing result can be obtained by processing the user interest information by the server.

According to various implementation methods of the user interest information, the user interest information can be processed differently.

In the first possible implementation, if the user interest information is the retrieval information input by the user of the first terminal device, the server acquires the corresponding search result based on the retrieval information. Here, the user interest information is the search information input by the user, and the information processing result is the search result.

In some embodiments, when the search result includes a plurality of contents, the server filters the plurality of contents according to the preset filtering rule, and obtains one content. Wherein the preset filtering rule includes but is not limited to any one or more of the followings: selecting the content clicked the most, selecting the content best matching the retrieved information, selecting the content selected by the user of the first terminal device.

In a second possible implementation, if the user interest information is the data information browsed by the user of the first terminal device, the server parses the data information to obtain the first key information. Here, the user interest information is the data information browsed by the user, the information processing result is the first key information.

The description of the data information can be shown at the step 202, the present embodiment does not describe hereby.

In a third possible implementation, if the user interest information is the subscription information subscribed by the user of the first terminal device, the server parses the subscription information to obtain the second key information. At this point, the user interest information is the subscription information subscribed by the user, the information processing result is the second key information.

The description of the subscription information can be shown at step 202, the present embodiment does not describe hereby.

In addition, for the second or third possible embodiment described above, the method processing the information includes, but is not limited to, at least one of the following: keyword extraction, semantic analysis, image recognition, speech recognition, and the like.

At step 210, the server obtains a second terminal device associated with the user interest information.

The second terminal device is adapted to perform the corresponding operation according to the information processing result. In one example, this step includes the following sub-steps.

1. Obtaining smart terminal devices bound to the first terminal device.

The first terminal device establishes a binding relationship with the smart terminal devices via the server, and the server stores the binding relationship between the first terminal and the intelligent terminal devices. The requester of the binding relationship may be the first terminal device or the intelligent terminal devices. The server records the device identification of each smart terminal device having the binding relationship with the first terminal device. In some embodiments, the server also records the device type of each smart terminal device having the binding relationship with the first terminal device, for example the device type including a multimedia playback device, a smart home appliance, and the like.

In some embodiments, the device type may be sent by the first terminal device; or, alternatively, it may be sent by the smart terminal devices.

2. Obtaining the information type corresponding to the user interest information.

Wherein, the information type includes but is not limited to multimedia information, weather information, etc. In actual applications, the information type can be divided according to the actual demands, such that the multimedia information is subdivided into video information, audio information, etc. For another example, the weather information is subdivided into weather type information, temperature information, humidity information, air pollution index information, etc.

In one example, the server obtains the keyword from the user interest information, and determines the information type corresponding to the user interest information according to the correspondence between the keyword and the information type.

Assuming that the user interest information is the retrieval information input by the user, and the retrieval information is "xx song", the server obtains the keyword "song" from the retrieval information, and determines the information type corresponding to the user interest information is audio information according to the correlation between the keyword and the information type Assuming that the user interest information is the data information browsed by the user, and the data information is "the latest album of xx", the keyword "album" can be extracted from the data information, and the information type corresponding to the user interest information is determined as audio information according to the correlation between the keyword and the information type.

Assuming that the user interest information is the user subscription information, and the subscription information is "xx TV series to 60 sets", the first terminal device acquires the keyword "TV series" from subscription information, according to the correspondence between the keyword and the information type, and the information type corresponding to the user interest information is determined as video information.

In another example, the server determines the information type corresponding to the user interest information, based on the information processing result corresponding to the user interest information.

Wherein the information type of the information processing result is the same as the information type of the user interest information. The server obtains the keyword from the information processing result; determines the information type corresponding to the information processing result according to the correspondence between the keyword and the information type of the information processing result, and determines the information type as the information type corresponding to the user interest information.

Assuming that the user interest information is the retrieval information, and the information processing result corresponding to the retrieval information is a related description of the song, the server acquires the keyword (the name of the song) from the related description, and determines the information type of the information processing result is audio information, and the information type corresponding to the user interest information is also audio information, according to the correspondence between the keyword and the information type.

Assuming that the user interest information is the data information, and the information processing result corresponding to the data information includes the weather information such as the weather type, temperature, humidity, etc., the server can extract a keyword of "Celsius" from the information processing result, according to the correlation between the keyword and the information type, determine that the information type of the information processing result is weather information, and the information type corresponding to the user interest information is weather information.

Assuming that the user interest information is the subscription information, and the information processing result corresponding to the subscription information including the xx movie update notification, the server can extract the keyword "movie" from the information processing result, and according to the correlation between the keyword and the information type, determine that the information type of the information processing result is video information, the information type corresponding to the user interest information is the video information too.

3. Inquiring the preset correlation, selecting the second terminal device corresponding to the information type from the intelligent terminal devices bound to the first terminal device;

Wherein, the preset correlation can include the correlation between the information types and the intelligent terminal devices.

In some embodiments, the preset correspondence may be added by the user to the first terminal device, when a binding relationship between the first terminal device and the smart terminal devices is established; or, the preset correlation may be sent by the server to the first terminal device, after a binding relationship between the first terminal device and the smart terminal devices is established.

If the information type is multimedia information, the first terminal device can select the multimedia player device from the intelligent terminal devices bound to the first terminal device, and the multimedia player device can be the second terminal device. Wherein, the multimedia player device can be smart speakers, smart TVs, smart projectors, computers, tablet devices, etc.

Noticeably, the number of the multimedia player devices selected by the server may be one or more, such as two or three, the embodiments of the present disclosure do not limit thereto. When the number of the multimedia player devices selected by the server is plural, the plurality of multimedia playback devices can be controlled to perform corresponding operations, respectively; or, one of the multimedia player devices can be selected from the plurality of multimedia player devices to perform the corresponding operation according to preset rules. Wherein, the preset rules may be a set of priorities for different multimedia player devices, one of the multimedia player devices can be selected according to the order of priorities from high to low; or, the preset rules may be randomly selecting one of the multimedia player devices, the embodiments of the present disclosure do not limit thereto.

If the information type is weather information, the server can select the smart home device from the smart terminal devices bound to the first terminal device, and the smart home device can be the second terminal device. Wherein, the smart home device can be smart air conditioners, smart air purifiers, balancing vehicles, sweeping robots, smart water purifiers, and so on.

Noticeably, the number of smart home devices selected by the server may be one or more, such as two or three, the embodiments of the present disclosure do not limit thereto. When the number of the smart home devices selected by the server is plural, the plurality of smart home devices can be controlled to perform corresponding operations, respectively; or, one of the smart home devices can be selected from the plurality of smart home devices to perform the corresponding operation according to preset rules. Wherein, the preset rules may be a set of priorities for different smart home devices, one of the smart home devices can be selected according to the order of priorities from high to low; or, the preset rules may be randomly selecting one of the smart home devices, the embodiments of the present disclosure do not limit thereto.

It should be noted that, in the present embodiment, the execution order of steps 209 and 210 is not limited. The step 209 may be performed before the step 210, after the step 210, or concurrently with the step 210.

In some embodiments, after the server determines the second terminal device, the device identification of the second terminal device and the information processing result may be transmitted to the first terminal device, and the information processing result may be transmitted from the first terminal device to the second terminal device, the second terminal device performs the corresponding operation according to the information processing result, which may refer to the steps 204 and 205 in the embodiment shown in FIG. 2A.

In some embodiments, if a communication connection is established between the server and the second terminal device, after the server determines the second terminal device, the server sends the information processing result directly to the second terminal device. In this case, following steps 211 and 212 are performed.

At step 211, the server transmits the information processing result to the second terminal devices, through the communication connection established between the server and the second terminal devices.

Accordingly, the second terminal device receives the information processing result obtained by processing the user interest information transmitted by the server, via the communication connection established between the server and the second terminal device.

At step 212, the second terminal device performs a corresponding operation according to the information processing result.

The description of this step is the same as that of step 205, and the present embodiment does not describe hereby.

Figure 3:
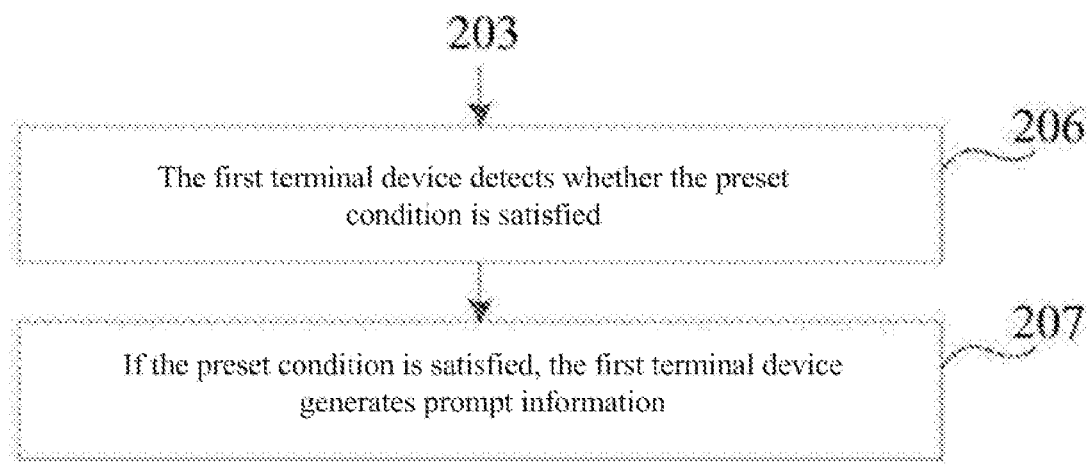
FIG. 3 is a flow diagram of an operating method shown in accordance with another exemplary embodiment.

As is shown in FIG. 3, in an embodiment in accordance with the embodiment shown in FIGS. 2A and 2C, after the acquiring the second terminal device associated with the user interest information, a first terminal device or server can perform the following steps. The present embodiment only describes the execution of the following steps by the first terminal device. The server detecting whether the second terminal device conforms to the description of the predetermined condition, and the first terminal device detecting whether the second terminal device conforms to the description of the predetermined condition, can both be conducted in the same way. The present embodiment does not describe them in detail hereby.

At step 206, the first terminal device can detect whether the preset condition is satisfied.

Wherein, the preset condition can comprise: the second terminal device is in an off state, and the first terminal device and the second terminal device are located in the same space.

In the embodiment of the present disclosure, the method in which the first terminal device obtains the operation state of the second terminal device is not limited. For example, the first terminal device may determine the operation state of the second terminal device according to the latest operation state information reported by the second terminal device; wherein, the operation state information can indicate the operation state of the second terminal device. For another example, the first terminal device can transmit a test signal to the second terminal device; if the first terminal device receives a feedback signal transmitted by the second terminal device and corresponding to the test signal, it can be determined that the second terminal device is at an on state; if the first terminal device does not receive a feedback signal transmitted by the second terminal device corresponding to the test signal, it can be determined that the second terminal device is at an off state.

In addition, the first terminal device and the second terminal device located in the same space can refer to that the first terminal device and the second terminal device have the same network environment, and/or, the distance between the first terminal device and the second terminal device is less than or equals to a preset distance.

The first terminal device may detect whether the second terminal device is in the same space through methods as follows:

In a first implementation, the first terminal device can detect whether a network identifier thereof matches with a network identifier of the second terminal device; if they match, the second terminal device is located in the same space as the first terminal device; if do not match, the second terminal device is located in a different space than the first terminal device. Wherein, the network identifier may be an IP (Internet Protocol) address, a MAC (Medium Access Control) address, etc., and it is not limited by the embodiment of the present disclosure.

In some embodiments, the network identification of the second terminal device may be sent when the second terminal is powered on last time, or may be sent when establishing the binding relationship of the second terminal device and the first terminal device.

In a second implementation, the first terminal device can acquire position information thereof and position information of the second terminal device; based on the position information, detect whether the distance between the first terminal device and the second terminal device is less than or equals to a preset distance; if the distance is less than or equals to the preset distance, the second terminal device can be located in the same space as the first terminal device; if the distance is greater than the preset distance, the second terminal device can be located in a different space.

In some embodiments, the location information of the second terminal device may be transmitted when the second terminal is powered on last time, or may be transmitted when establishing the binding relationship between the second terminal device and the first terminal device.

At step 207, if the preset condition is satisfied, the first terminal device can generate prompt information.

The prompt information can prompt the user of the first terminal device to turn on the second terminal device, so that the second terminal device can perform the corresponding operation according to the information processing result. In the embodiment of the present disclosure, the implementation of the prompt information is not restricted. For example, the first terminal device may display a prompt message, or may play an audio prompt message, or may send the prompt message as a sound and light alarm.

In one implementation, after the first terminal device generates the prompt message, the user can manually turn on the second terminal device, so that the second terminal device can perform the corresponding operation according to the information processing result. In another implementation, after the first terminal device generates the prompt information, the first terminal device can receive confirmation information input by the user, wherein the confirmation information instructs the user to confirm turning on the second terminal device; the first terminal device can send a start command to the second terminal device based on the confirmation information; the second terminal device can be turned on after receiving the start command, and perform the corresponding operation according to the information processing result. In this way, the user can turn on the second terminal device through the first terminal device, the operation can be more efficient and convenient.

In the method described above, the first terminal device can prompt the user to turn on the second terminal device, and the user can decide whether to turn on the second terminal device determined by the first terminal device according to the actual need, to fully satisfy the user requirement by performing the corresponding operation through the second terminal device, and to reduce the occurrence of maloperation due to the second terminal device determined by the first terminal device not meeting the user requirement.

In some embodiments, the preset condition comprises: the second terminal device is in an off state. Here, the first terminal device only needs to generate a prompt message when the second terminal device is at the off state, to prompt the user of the first terminal device to turn on the second terminal device.

In some embodiments, after the first terminal device outputs the prompt information, first execution confirmation information can be output, wherein the first execution confirmation information is provided to the user of the first terminal device to confirm whether the second terminal device will perform the corresponding operation according to the information processing result. When the first terminal device receives the operation confirmation input by the user of the first terminal device in response to the first execution confirmation information, it transmits the execution operation instruction to the second terminal device, and the second terminal device performs the corresponding operation according to the information processing result after receiving the execution operation instruction.

In some embodiments, after the second terminal device is turned on, before the corresponding operation is performed according to the information processing result, the second execution confirmation information is output, wherein the second execution confirmation information is provided to the user of the second terminal device to confirm whether the second terminal device operates according to the information processing result. When the second terminal device receives the confirmation operation input by the user of the second terminal device based on the second execution confirmation information, performs the corresponding operation according to the information processing result.

Noticeably, in the embodiment described above, the steps of the first terminal device can be implemented separately as an operation execution method of the first terminal device, and the steps on the second terminal device can be implemented separately as an operation execution method of the second terminal device.

The embodiments of the present disclosure provide an operating system, the system comprising: a first terminal device and a second terminal device.

The first terminal device includes the first terminal device 110 provided in the embodiments shown in FIG. 1 or based on FIG. 1.

The second terminal device includes the second terminal device 120 provided in the embodiments shown in FIG. 1 or based on FIG. 1.

An exemplary embodiment of the present disclosure also provides an operation apparatus capable of implementing an operation method on the first terminal device side provided by the present disclosure, the apparatus comprising: a processor; and a non-transitory computer readable storage medium storing instructions executed by the processor; wherein the processor is configured to: acquire user interest information in which a user of a first terminal device is interested; process the user interest information to obtain an information processing result; identify a second terminal device associated with the user interest information; and transmit the information processing result to the second terminal device via a communication connection established with the second terminal device, wherein the second terminal device performs a corresponding operation in accordance with the information processing result.

In some embodiments, the processor is further configured to: retrieve a corresponding search result processed based on search information when the user interest information is the search information input by the user of the first terminal device; or parse data information and acquire first key information when the user interest information is the data information browsed by the user of the first terminal device; or parse subscription information and acquire second key information when the user interest information is the subscription information subscribed by the user of the first terminal device.

In some embodiments, the processor is further configured to: acquire smart terminal device bound to the first terminal device; obtain an information type corresponding to the user interest information; and inquire predetermined correlations to select the second terminal device corresponding to the information type from the intelligent terminal device bound to the first terminal device; wherein the predetermined correlations include a correlation between the information type and the smart terminal device.

In some embodiments, the processor is configured to: extract a keyword from the user interest information, and determine the information type corresponding to the user interest information according to a correlation between the keyword and the information type; or determine the information type corresponding to the user interest information in accordance with the information processing result corresponding to the user interest information.

In some embodiments, the processor is further configured to: select a multimedia player device from the intelligent terminal devices bound to the first terminal device when the information type is multimedia information, wherein the multimedia player device is the second terminal device; or select a smart home device from the intelligent terminal devices bound to the first terminal device, when the information type is weather information, wherein the smart home device is the second terminal device.

In some embodiments, the processor is further configured to: transmit the information processing result to a server, wherein the server forwards the information processing result to the second terminal device; or transmit the information processing result to a router, wherein the router forwards the information processing result to the second terminal device; or transmit the information processing result to the second terminal device through a direct communication connection established between the first and the second terminal devices.

In some embodiments, the processor further configured to: generate prompt information when the second terminal device is in an off state, and the first terminal device and the second terminal device are located in the same space; wherein the prompt information prompts the user of the first terminal device to turn on the second terminal device, wherein the second terminal device performs the corresponding operation based on the information processing result.

The embodiments of the present disclosure also provide an operation apparatus capable of implementing the operation method performed by the second terminal device side. The operation apparatus comprises: a processor, and a non-transitory computer readable storage medium storing instructions executed by the processor; wherein the processor is configured to: receive an information processing result obtained by processing user interest information transmitted by a first terminal device via a communication connection established with the first terminal device; wherein the user interest information is the information in which a user of the first terminal device is interested; and perform a corresponding operation according to the information processing result.

In some embodiments, the processor is further configured to: play the information processing result having an information type of multimedia information when the information type of the information processing result is the multimedia information; or adjust home environment according to the weather information corresponding to the information type of the information processing result, when the information type of the information processing result is the weather information.

In some embodiments, the processor is further configured to: receive the information processing result forwarded by the server after it is transmitted by the first terminal device to the server; or receive the information processing result forwarded by the router after it is transmitted by the first terminal device to the router; or receive the information processing result from the first terminal device, via the direct communication connection established with the first terminal.

Figure 4:
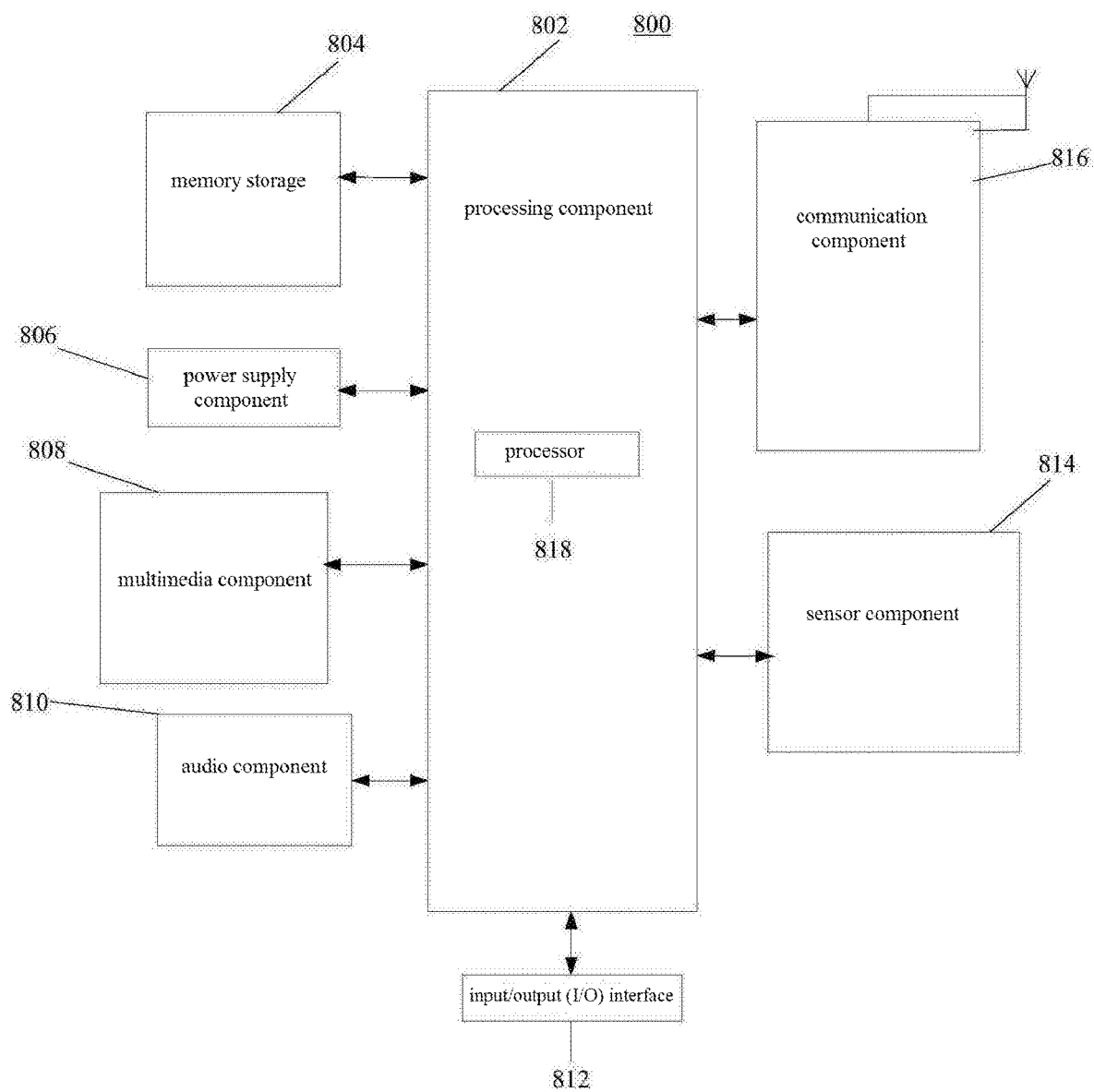
FIG. 4 is a block diagram of an apparatus shown in accordance with an exemplary embodiment.

FIG. 4 is a block diagram of an apparatus 800 in accordance with an exemplary embodiment. For example, the apparatus 800 may be a mobile phone, a computer, a digital broadcast terminal, a messaging device, a game console, a tablet device, a medical device, a fitness device, a personal digital assistant, and the like.

As shown in FIG. 4, the apparatus 800 may include one or more of the following components: a processing component 802, a memory storage 804, a power supply component 806, a multimedia component 808, an audio component 810, an input/output (I/O) interface 812, a sensor component 814, and a communication component 816.

The processing component 802 generally can control the overall operation of the apparatus 800, such as operations associated with display, phone call, data communication, camera operation, and recording operation. The processing component 802 may include one or more processors 818 to execute instructions, to complete all or part of the steps described above. In addition, the processing component 802 may include one or more modules to facilitate the interactions between the processing component 802 and other components. For example, the processing component 802 may include a multimedia module to facilitate interaction between the multimedia component 808 and the processing component 802.

The memory 804 can be configured to store various types of data to support the operation of the apparatus 800. Examples of such data can include instructions of any application or method operating on the apparatus 800, contact data, phonebook data, messages, pictures, videos, and the like. The memory storage 804 may be implemented by any type of volatile or nonvolatile memory device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, disk or CD.

The power supply component 806 can provide power to the various components of the apparatus 800. The power supply component 806 may include a power management system, one or more power supplies, and other components associated with generating, managing, and distributing power for the apparatus 800.

The multimedia component 808 may include a screen providing an output interface between the apparatus 800 and the user. In some embodiments, the screen may include a liquid crystal display (LCD) and a touch panel (TP). If the screen includes a touch panel, the screen may be implemented as a touch screen to receive input signals from the user. The touch panel can include one or more touch sensors to sense touches, slides, and gestures on touch panels. The touch sensors may sense not only the boundary of the touch or slide actions, but also the duration and pressure associated with the touch or slide operation. In some embodiments, the multimedia component 808 may include a front camera and/or a rear camera. When the apparatus 800 is at an operating mode, such as a shooting mode or a video mode, the front camera and/or the rear camera can receive external multimedia data. Each front camera and rear camera can be a fixed optical lens system or have focal length and optical zoom capability.

The audio component 810 can be configured to output and/or input an audio signal. For example, the audio component 810 can include a microphone (MIC) that is configured to receive external audio signals when the apparatus 800 is in the operating mode, such as a call mode, a recording mode, and a voice recognition mode. The received audio signals may be further stored in the memory storage 804 or transmitted via the communication component 816. In some embodiments, the audio component 810 can also include a speaker for outputting the audio signals.

The I/O interface 812 can provide the interface between the processing component 802 and a peripheral interface module, the peripheral interface module may be a keyboard, a mouse, buttons, or the like. The buttons may include, but are not limited to, a home button, a volume button, a start button, and a lock button.

The sensor component 814 may include one or more sensors for providing condition assessments of the various aspects of the apparatus 800. For example, the sensor assembly 814 may detect the on/off state of the apparatus 800, the relative positioning of the components, such as the components can be the display and keypad of the apparatus 800, and the sensor component 814 may also detect position changes of the apparatus 800 or any component thereof, presence or absence of the user contact with the apparatus 800, orientation, acceleration/deceleration, or the temperature changes of the apparatus 800. The sensor component 814 may include a proximity sensor configured to detect the presence of a nearby object without any physical contact. The sensor component 814 may also include a light sensor, such as a CMOS or CCD image sensor, for imaging applications. In some embodiments, the sensor component 814 may also include acceleration sensors, gyro sensors, magnetic sensors, pressure sensors, or temperature sensors.

The communication component 816 can be configured to facilitate wired or wireless communication between the apparatus 800 and other apparatuses. The apparatus 800 may access a wireless network based on a communication standard, such as WiFi, 2G or 3G, or a combination thereof. In an exemplary embodiment, the communication component 816 can receive broadcast signals or broadcast-related information from an external broadcast management system via broadcast channels. In an exemplary embodiment, the communication component 816 can also include a near field communication (NFC) module to facilitate short-range communication. For example, the NFC module may be implemented based on radio frequency identification (RFID) technology, infrared data association (IrDA) technology, ultra wideband (UWB) technology, Bluetooth (BT) technology and other techniques.

In an exemplary embodiment, the apparatus 800 may be implemented by one or more application specific integrated circuits (ASICs), digital signal processors (DSPs), digital signal processing devices (DSPDs), programmable logic devices (PLDs), field programmable gate array (FPGA), a controller, a microcontroller, a microprocessor, or other electronic components for performing the method described above.

In an exemplary embodiment, there is also provided a non-transitory computer readable storage medium comprising at least an instruction, at least a program, at least a code set or instruction set, and the at least an instruction, at least a program, at least a code set or instruction set can be loaded and executed on a processor for implementation of the above operation methods. For example, the memory storage 804 including the instructions, the instructions may be executed by the processor 818 of the apparatus 800 to complete the method described above. For example, the non-transitory computer readable storage medium may be a ROM, a random access memory (RAM), a CD-ROM, a magnetic tape, a floppy disk, an optical data storage device, etc.

The apparatus 800 can perform the method described above in accordance with the non-transitory computer readable storage medium, when the instructions in the storage medium are executed by the processor of the apparatus 800.

Understandably, the term "plurality" herein refers to two or more. "And/or" herein describes the correspondence of the corresponding objects, indicating three kinds of relationship. For example, A and/or B, can be interpreted as: A exists alone, A and B exist concurrently, B exists alone. The character "/" generally indicates that the context object is an "OR" relationship.

Other embodiments of the present disclosure can be available to those skilled in the art upon consideration of the specification and practice of the invention disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

Understandably, this disclosure is not limited to the precise constructions described above and shown in the enclosed drawings, and various modifications and changes may be made without departing from the scope thereof. The scope of the present disclosure can be limited only by the appended claims.

What is claimed is:

1. An operating method comprising:
  acquiring user interest information in which a user of a first terminal device is interested;
  processing the user interest information to obtain an information processing result;
  identifying a second terminal device associated with the user interest information; and
  transmitting the information processing result to the second terminal device via a communication connection established with the second terminal device, wherein the second terminal device performs a corresponding operation in accordance with the information processing result,
  wherein identifying the second terminal device associated with the user interest information comprises:
    identifying smart terminal devices bound to the first terminal device;
    obtaining an information type corresponding to the user interest information; and inquiring preset correlations to select the second terminal device corresponding to the information type from the smart terminal devices bound to the first terminal device, wherein the preset correlations include a correlation between the information type and the smart terminal device.

2. The method of claim 1, wherein processing the user interest information to obtain the information processing result comprises:
retrieving a corresponding search result based on search information, when the user interest information is the search information input by the user of the first terminal device; or,
parsing data information and acquiring first key information, when the user interest information is the data information browsed by the user of the first terminal device; or,
parsing subscription information and acquiring second key information, when the user interest information is the subscription information subscribed by the user of the first terminal device.

3. The method of claim 1 wherein obtaining the information type corresponding to the user interest information includes:
extracting a keyword from the user interest information to determine the information type corresponding to the user interest information according to a correlation between the keyword and the information type; or,
determining the information type corresponding to the user interest information according to the information processing result corresponding to the user interest information.

4. The method of claim 1, wherein inquiring the preset correlations to select the second terminal device corresponding to the information type from the smart terminal devices bound to the first terminal device comprises:
selecting a multimedia player device from the smart terminal devices bound to the first terminal device when the information type is multimedia information, wherein the multimedia player device is the second terminal device; or,
selecting a smart home device from the smart terminal devices bound to the first terminal device when the information type is weather information, wherein the smart home device is the second terminal device.

5. The method of claim 1, wherein transmitting the information processing result to the second terminal device via the communication connection established with the second terminal device comprises:
transmitting the information processing result to a server, wherein the server forwards the information processing result to the second terminal device; or,
transmitting the information processing result to a router, wherein the router forwards the information processing result to the second terminal device; or,
transmitting the information processing result to the second terminal device via a direct communication connection established between the first and second terminal devices.

6. The method of claim 1 further comprising:
generating prompt information, when the second terminal device is in an off state and the first terminal device and the second terminal device are located in the same space; wherein the prompt information prompts the user of the first terminal device to turn on the second terminal device, wherein the second terminal device performs the corresponding operation in accordance with the information processing result.

7. The method of claim 1, wherein the preset correlations are stored in a lookup table.

8. An operating method, applied in a second terminal, comprising:
receiving an information processing result obtained by processing user interest information transmitted by a first terminal device via a communication connection established with the first terminal device; wherein the user interest information is the information in which a user of the first terminal device is interested; and
performing a corresponding operation in accordance with the information processing result,
wherein the second terminal is associated with the user interest information and is identified by the first terminal by:
identifying smart terminal devices bound to the first terminal device;
obtaining an information type corresponding to the user interest information; and
inquiring preset correlations to select the second terminal device corresponding to the information type from the smart terminal devices bound to the first terminal device, wherein the preset correlations include a correlation between the information type and the smart terminal device.

9. The method of claim 8, wherein performing the corresponding operation in accordance with the information processing result comprises:
playing multimedia information corresponding to an information type of the information processing result, when the information type of the information processing result is the multimedia information; or,
adjusting home environment according to weather information corresponding to an information type of the information processing result, when the information type of the information processing result is the weather information.

10. The method of claim 8, wherein receiving the information processing result obtained by processing the user interest information transmitted by the first terminal device via the communication connection established with the first terminal device comprises:
receiving the information processing result forwarded by a server after it is transmitted by the first terminal device to the server; or,
receiving the information processing result forwarded by a router after it is transmitted by the first terminal device to the router; or,
receiving the information processing result from the first terminal device, via a direct communication connection established with the first terminal device.

11. An operation apparatus comprising:
a processor;
a memory storage medium storing executable instructions executed by the processor;
wherein the processor is configured to:
acquire user interest information in which a user of a first terminal device is interested;
process the user interest information to obtain an information processing result;
identify a second terminal device associated with the user interest information; and
transmit the information processing result to the second terminal device via a communication connection established with the second terminal device, wherein the second terminal device performs a corresponding operation in accordance with the information processing result, wherein the processor is further configured to:
identify smart terminal devices bound to the first terminal device;
obtain an information type corresponding to the user interest information; and
inquire preset correlations to select the second terminal device corresponding to the information type from the smart terminal devices bound to the first terminal device, wherein the preset correlations include a correlation between the information type and the smart terminal device.

12. The apparatus of claim 11 wherein the processor is further configured to:
retrieve a corresponding search result processed based on search information, when the user interest information is the search information input by the user of the first terminal device; or
parse data information and acquire first key information, when the user interest information is the data information browsed by the user of the first terminal device; or
parse subscription information and acquire second key information, when the user interest information is the subscription information subscribed by the user of the first terminal device.

13. The apparatus of claim 11, wherein the processor is further configured to:
extract a keyword from the user interest information to determine the information type corresponding to the user interest information according to a correlation between the keyword and the information type; or
determine the information type corresponding to the user interest information in accordance with the information processing result corresponding to the user interest information.

14. The apparatus of claim 11, wherein the processor is further configured to:
select a multimedia player device from the smart terminal devices bound to the first terminal device when the information type is multimedia information, wherein the multimedia player device is the second terminal device; or
select a smart home device from the smart terminal devices bound to the first terminal device when the information type is weather information, wherein the smart home device is the second terminal device.

15. The apparatus of claim 11, wherein the processor is further configured to:
transmit the information processing result to a server, wherein the server forwards the information processing result to the second terminal device; or
transmit the information processing result to a router, wherein the router forwards the information processing result to the second terminal device; or,
transmit the information processing result to the second terminal device via a direct communication connection established between the first and second terminal devices.

16. The apparatus of claim 11, wherein the processor is further configured to:
generate prompt information when the second terminal device is in an off state, and the first terminal device and the second terminal device are located in the same space;
wherein the prompt information prompts the user of the first terminal device to turn on the second terminal device, wherein the second terminal device performs the corresponding operation in accordance with the information processing result.

17. An operation apparatus comprising:
a processor;
a memory storage storing executable instructions executed by the processor;
wherein the processor is configured to:
receive an information processing result obtained by processing user interest information transmitted by a first terminal device via a communication connection established with the first terminal device; wherein the user interest information is the information in which a user of the first terminal device is interested; and
perform a corresponding operation in accordance with the information processing result,
wherein the operation apparatus is associated with the user interest information and is identified by the first terminal by:
identifying smart terminal devices bound to the first terminal device;
obtaining an information type corresponding to the user interest information; and
inquiring preset correlations to select the operation apparatus corresponding to the information type from the smart terminal devices bound to the first terminal device, wherein the preset correlations include a correlation between the information type and the smart terminal device.

18. The apparatus of claim 17, wherein the processor is further configured to:
play multimedia information corresponding to an information type of the information processing result when the information type of the information processing result is the multimedia information; or,
adjust home environment according to weather information corresponding to an information type of the information processing result when the information type of the information processing result is the weather information.

* * * * *